US011050584B2

(12) United States Patent
Yanagida

(10) Patent No.: US 11,050,584 B2
(45) Date of Patent: Jun. 29, 2021

(54) VEHICLE COMMUNICATION SYSTEM

(71) Applicant: Yazaki Corporation, Tokyo (JP)

(72) Inventor: You Yanagida, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/790,735

(22) Filed: Feb. 14, 2020

(65) Prior Publication Data

US 2020/0304335 A1 Sep. 24, 2020

(30) Foreign Application Priority Data

Mar. 18, 2019 (JP) .............................. JP2019-049495

(51) Int. Cl.
| | |
|---|---|
| *H04B 10/278* | (2013.01) |
| *H04L 12/40* | (2006.01) |
| *H04B 3/36* | (2006.01) |
| *H04B 3/52* | (2006.01) |
| *H04B 10/25* | (2013.01) |
| *H04B 10/29* | (2013.01) |

(52) U.S. Cl.
CPC ............... *H04L 12/40* (2013.01); *H04B 3/36* (2013.01); *H04B 3/52* (2013.01); *H04B 10/25* (2013.01); *H04B 10/29* (2013.01); *H04L 2012/40273* (2013.01)

(58) Field of Classification Search
CPC .................................................. H04B 10/278
See application file for complete search history.

(56) References Cited

U.S. PATENT DOCUMENTS

| 10,875,479 B2* | 12/2020 | Takamatsu | .......... B60R 16/0215 |
| 2003/0215235 A1* | 11/2003 | Norizuki | .............. H04B 10/275 |
| | | | 398/59 |
| 2009/0158360 A1* | 6/2009 | Diab | ....................... H04L 12/40 |
| | | | 725/75 |
| 2009/0319116 A1* | 12/2009 | Keller | ...................... G07C 7/00 |
| | | | 701/31.4 |
| 2010/0215043 A1 | 8/2010 | Hisada | |
| 2012/0154785 A1* | 6/2012 | Gilliland | ............... G01S 17/931 |
| | | | 356/5.01 |
| 2018/0001848 A1 | 1/2018 | Shiratori et al. | |
| 2019/0068510 A1 | 2/2019 | Endo et al. | |

FOREIGN PATENT DOCUMENTS

| JP | 2018-1861 A | 1/2018 |
| JP | 2018-74306 | 5/2018 |

* cited by examiner

*Primary Examiner* — Nathan M Cors
(74) *Attorney, Agent, or Firm* — Kenealy Vaidya LLP

(57) ABSTRACT

A vehicle communication system includes a core module, a first terminal module, and a second terminal module. The core module is installed in a vehicle and includes a first switching hub, a second switching hub, and a core communication line bundle. The first and the second switching hubs relay the data. The core communication line bundle includes a core optical cable that propagates optical signals and a core electrical wire that conducts electrical signals. In the core communication line bundle, the core optical cable and the core electrical wire couple the first switching hub and the second switching hub for communication. In the core communication line bundle, the core optical cable has a larger communication traffic volume than that of the core electrical wire.

5 Claims, 3 Drawing Sheets

VEHICLE COMMUNICATION SYSTEM

CROSS-REFERENCE TO RELATED APPLICATION(S)

The present application claims priority to and incorporates by reference the entire contents of Japanese Patent Application No. 2019-049495 filed in Japan on Mar. 18, 2019.

BACKGROUND OF THE INVENTION

1. Field of the Invention

The present invention relates to a vehicle communication system.

2. Description of the Related Art

As a conventional vehicle communication system, for example in Japanese Patent Application Laid-open No. 2018-74306, an in-vehicle communication system is disclosed including a manager device installed on a vehicle that outputs control instructions, and a vehicle control device that is connected by way of a communication line to the manager device and controls the in-vehicle equipment according to control instructions output from the manager device.

However, the in-vehicle communication system in Japanese Patent Application Laid-open No. 2018-74306 should include various modifications for improvement after constructing the in-vehicle communication system such as a modification to reduce the communication noise between the manager device and the vehicle control device.

SUMMARY OF THE INVENTION

In view of the above issues, an objective of the present invention is to provide a vehicle communication system capable of properly constructing a system.

In order to solve the above mentioned problem and achieve the object, a vehicle communication system according to one aspect of the present invention includes a core module that is installed in a vehicle and includes a first relay device to relay data, a second relay device to relay data, and a core communication line bundle including a core optical communication line to propagate optical signals and a core electrical wire to conduct electrical signals, the core communication line bundle coupling the first relay device and the second relay device for communication by way of the core optical communication line and the core electrical wire; a first terminal module that includes a plurality of first terminal devices, and a first terminal communication line bundle that couples the first terminal devices and the first relay device for communication; and a second terminal module that includes a plurality of second terminal devices, and a second terminal communication line bundle that couples the second terminal devices and the second relay device for communication, wherein in the core communication line bundle, the core optical communication line has a larger communication traffic volume than that of the core electrical wire.

According to another aspect of the present invention, in the vehicle communication system, it is preferable that the first terminal communication line bundle and the second terminal communication line bundle include at least one of a terminal optical communication line that propagates optical signals and a terminal electrical wire that conducts electrical signals, and number of terminal electrical wires is larger than number of terminal optical communication lines.

According to still another aspect of the present invention, in the vehicle communication system, it is preferable that the first terminal module is installed at a front section side of the vehicle along an overall length direction of the vehicle, the second terminal module is installed at a rear section side of the vehicle along the overall length direction of the vehicle, and the core communication line bundle is installed at an intermediate section between the front section of the vehicle and the rear section of the vehicle.

According to still another aspect of the present invention, in the vehicle communication system, it is preferable that the core module includes a standard specification section applicable commonly to a plurality of vehicles, and the first terminal module and the second terminal module include a separate specification section for individual changes according to the vehicle.

In order to achieve the object, a vehicle communication system according to still another aspect of the present invention includes a first terminal module that is installed in a vehicle and includes a plurality of first terminal devices, a first relay device to relay data among the first terminal devices, and a first terminal communication line bundle that couples the first terminal devices and the first relay device; a second terminal module that includes a plurality of second terminal devices, a second relay device to relay data among the second terminal devices, and a second terminal communication line bundle that couples the second terminal devices and the second relay device; and a core communication line bundle that includes a core optical communication line to propagate optical signals and a core electrical wire to conduct electrical signals, and that couples the first relay device and the second relay device for communication by way of the core optical communication line and the core electrical wire, wherein in the core communication line bundle, the core optical communication line has a larger communication traffic volume than that of the core electrical wire.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
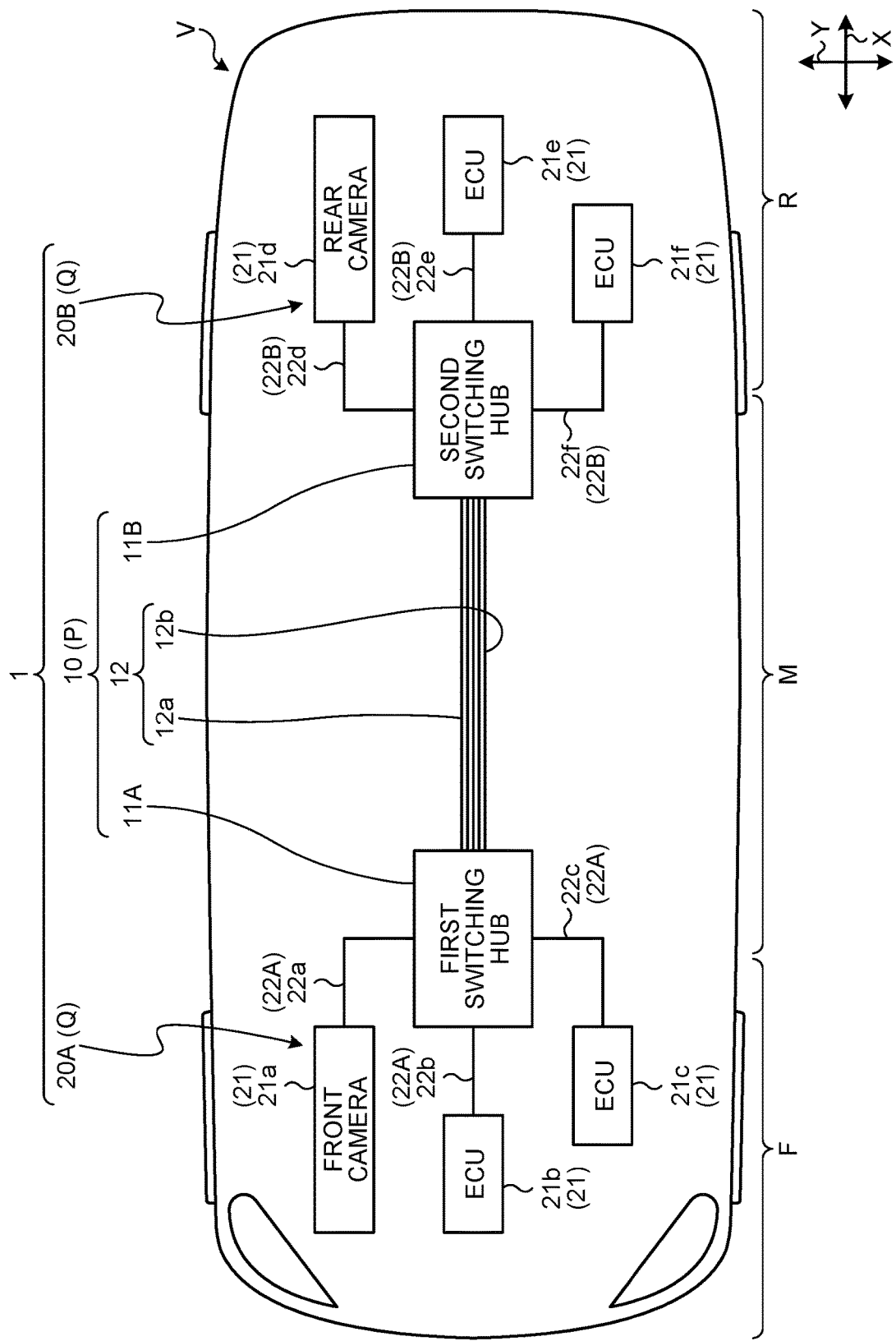
FIG. 1 is a block diagram illustrating an example of the structure of the vehicle communication system of the first embodiment.

The embodiments of the present invention are described in detail while referring to the drawings. The present invention is not limited by the description in the following embodiments. The structural elements described below can be readily assumed by one skilled in the art and may include structural elements that are substantially the same. The structure described below may also be assembled as is convenient. The various elements of the structure of the present invention may be omitted, substituted or changed within a range not departing from the scope and spirit of the present invention.

First Embodiment

A vehicle communication system 1 of the first embodiment is described while referring to the drawing. FIG. 1 is a block diagram illustrating an example of the structure of the vehicle communication system 1 of the first embodiment. The vehicle communication system 1 is applied to a vehicle V and is a system for coupling devices installed in the vehicle V and providing communication in the vehicle V. The vehicle communication system 1 configures an in-vehicle Local Area Network (LAN) that is a network installed in the vehicle V. The in-vehicle LAN may for example employ a communication standard for the Ethernet (registered trademark) but is not limited to this standard.

Here, in the vehicle V, the overall length direction X is typically equivalent to the front-rear direction of the vehicle V and may further be expressed as the straight forward-rearward direction of the vehicle V. The vehicle width direction Y is typically equivalent to the overall width direction of the vehicle V and equivalent to the left-right directions of the vehicle V. Moreover, in the following description, in regard to the overall length direction X, the vehicle V side that moves forward is in some cases referred to as the "front F", and the vehicle V side that moves rearward is the "rear R" Unless stated otherwise, each direction in the following description expresses a direction in the state that each section is mutually assembled.

As illustrated in FIG. 1, the vehicle communication system 1 includes a core module 10, a first terminal module 20A, and a second terminal module 20B. The core module 10 is installed on the vehicle V and is the core section of the communication system for the vehicle V and is for example called the backbone. The core module 10 is provided along the overall length direction X in the vehicle V. The core module 10 includes the standard specification P applicable commonly to a plurality of vehicles V. The standard specification section P is designed for standardized usage to the greatest extent possible and to provide common usage and versatility regardless of the applicable vehicle model, platform, or vehicle grade etc. Along with improving the value of the vehicle V by configuring a high quality communication system, the standard specification section P can also prevent a rise in price by increasing the shipment volume through standardizing the (part) members.

The first terminal module 20A and the second terminal module 20B on the other hand, configure the separate specification section Q that allows individual changes according to the vehicle V. The separate specification section Q can meet various customer needs by providing variations according to the vehicle model, platform, and vehicle grade, etc. Providing the standard specification section P and the separate specification section Q for the vehicle communication system 1 achieves a good balance of both improvement in versatility for standard and common usage of (part) members and along with optimizing variations through a large selection of members. The vehicle communication system 1 is next described in detail.

As illustrated in FIG. 1, the core module 10 includes a first switching hub 11A as a first relay device, a second switching hub 11B as a second relay device, and a core communication line bundle 12. In the core module 10, the core communication line bundle 12 is configured in a line state (linear shape) to configure a linear communication network.

The first switching hub 11A relays the data. The first switching hub 11A is installed on the front F side along the overall length direction X of the vehicle V. The first switching hub 11A is coupled to the first terminal module 20A and the core communication line bundle 12, and transfers data (Ethernet frames) output from the first terminal module 20A by way of the core communication line bundle 12 to the second terminal module 20B. The first switching hub 11A inputs the data (Ethernet frames) output from the second terminal module 20B by way of the core communication line bundle 12 and transfers the input data (Ethernet frames) to the first terminal module 20A.

The first switching hub 11A transfers the data based for example on a routing table. In this routing table, the MAC address for electronic components 21 such as a front camera 21a, an ECU 21b, and an ECU 21c that are described below, corresponds to the port numbers of the input/output I/F of the first switching hub 11A. The first switching hub 11A compares the destination MAC address included in the Ethernet frame that is input, with the MAC address for the electronic component 21 that is registered in the routing table. The first switching hub 11A then detects the MAC address for the electronic component 21 matching the detected destination MAC address, and obtains the port number that is linked to the detected MAC address of the electronic component 21. The first switching hub 11A then outputs the Ethernet frame to the input/output I/F port indicated by the obtained port number.

The second switching hub 11B relays the data and is configured the same as the first switching hub 11A. The second switching hub 11B is installed on the rear R side of the overall length direction X of the vehicle V. The second switching hub 11B is coupled to the second terminal module 20B and the core communication line bundle 12, and transfers the data (Ethernet frames) output from the second terminal module 20B by way of the core communication line bundle 12 to the first terminal module 20A. The second switching hub 11B inputs the data (Ethernet frames) output from the first terminal module 20A by way of the core communication line bundle 12 and transfers the input data (Ethernet frames) to the second terminal module 20B.

The second switching hub 11B transfers the data based for example on the routing table. In this routing table the MAC address for the electronic component 21 such as a rear camera 21d, an ECU 21e, 21f corresponds to the port numbers of the input/output I/F of the second switching hub 11B. The second switching hub 11B compares the destination MAC address included in the Ethernet frame that is input, with the MAC address of the electronic component 21 that is registered in the routing table. The second switching hub 11B then detects the MAC address for the electronic component 21 matching the destination MAC address, and obtains the port number that is linked to the detected MAC address of the electronic component 21. The second switching hub 11B then outputs the Ethernet frame to the input/output I/F port indicated by the obtained port number.

The core communication line bundle 12 couples the first switching hub 11A with the second switching hub 11B for communication. The core communication line bundle 12 is installed in the intermediate section M between the front F of vehicle V and the rear R of the vehicle V, extending along the overall length direction X of the vehicle V. The core communication line bundle 12 includes a core optical cable 12a and a core electrical wire 12b.

The core optical cable 12a is an optical fiber that propagates the optical signal. The core optical cable 12a is for example configured with quartz glass optical fiber and plastic optical fiber. The core optical cable 12a employs optical fibers such as multimode optical fiber having a plurality of modes for propagating optical signals and single mode optical fiber having one mode for propagating optical signals. One end of the core optical cable 12a is coupled to the first switching hub 11A, and the other end is coupled to the second switching hub 11B.

Conversion units such as an optical-electrical conversion unit to convert optical signals into electrical signals and an electric-optical conversion unit for converting electrical signals into optical signals are installed between the core optical cable 12a and the first switching hub 11A. In the same way, conversion units such as an optical-electrical conversion unit for converting optical signals into electrical signals and an electric-optical conversion unit for converting electrical signals into optical signals are installed between the core optical cable 12a and the second switching hub 11B.

The core optical cable 12a outputs an optical signal output from the first switching hub 11A and converted by the electric-optical conversion unit, to the second switching hub 11B. The core optical cable 12a outputs an optical signal output from the second switching hub 11B and converted by the electric-optical conversion unit, to the first switching hub 11A.

The core electrical wire 12b extends along the overall length direction X of the vehicle V. In other words, the core electrical wire 12b is arranged to run in parallel with the core optical cable 12a. The core electrical wire 12b is a wire that conducts electrical signals and for example may include a wire with an insulation coating applied to a core wire that includes a plurality of conductive metal wires bundled and twisted together, a metal rod with an insulation coating applied to a conductive rod member, a bus bar, and a planar circuit body (for example, Flexible Printed Circuits (FPC) and Flexible Flat Cable (FFC)), etc. One end of the core electrical wire 12b is coupled to the first switching hub 11A, and the other end is coupled to the second switching hub 11B.

The core electrical wire 12b outputs an electrical signal output from the first switching hub 11A to the second switching hub 11B. The core electrical wire 12b outputs an electrical signal output from the second switching hub 11B to the first switching hub 11A.

The core communication line bundle 12 in this way communicates optical signals between the first terminal module 20A and the second terminal module 20B by way of the core optical cable 12a, and also communicates electrical signals by way of the core electrical wire 12b. The core optical cable 12a of the core communication line bundle 12 has a larger communication traffic volume than that of the core electrical wire 12b. In other words, the communication traffic volume of the core optical cable 12a is more than half of the total communication traffic volume of the core communication line bundle 12 including the communication traffic volume from the core optical cable 12a and the communication traffic volume from the core electrical wire 12b. The communication traffic volume of the core electrical wire 12b is in other words less than half of the total communication traffic volume of the core communication line bundle 12.

Here, the communication traffic volume of the core optical cable 12a is the communication traffic volume (for example, expressed in megabytes (MB), gigabytes (GB)) of data propagating through the core optical cable 12a. The communication traffic volume from the core optical cable 12a is for example, the communication traffic volume of data propagating through the core optical cable 12a within a fixed period of time, or the communication traffic volume of data propagating through the core optical cable 12a during the period for processing the predetermined task. The communication traffic volume of the core electrical wire 12b is the communication traffic volume (for example, expressed in megabytes (MB), gigabytes (GB)) of data flowing in the core electrical wire 12b. The communication traffic volume of the core electrical wire 12b is for example the communication traffic volume of data flowing in the core electrical wire 12b for a fixed period of time, or the communication traffic volume of data flowing in the core electrical wire 12b during the period for processing a predetermined task. The above stated fixed time period is for example, single hour units or units of several hours, units of several dozen hours, or a period of one day. The above stated predetermined task is the task relating to the driving of the vehicle V, etc.

The first terminal module 20A includes a plurality of electronic components 21 (first terminal device) of the vehicle V. The first terminal module 20A is installed on the front F side of the vehicle V along the overall length direction X of the vehicle V. The first terminal module 20A includes for example, the electronic components 21 and a first terminal communication line bundle 22A. The electronic components 21 include for example, the front camera 21a, the ECUs 21b, 21c. The front camera 21a is for example for capturing forward vehicle images, etc. of the vehicle V. The ECUs 21b, 21c are for example, for controlling the electrical power steering and the airbag etc. of the vehicle V.

The first terminal communication line bundle 22A couples the electronic components 21 and the first switching hub 11A for communication. The first terminal communication line bundle 22A includes a terminal optical cable 22a and terminal electrical wires 22b, 22c. The terminal optical cable 22a is an optical fiber for propagating the optical signal, and as described above, is configured from quartz glass optical fiber and plastic optical fiber. The terminal optical cable 22a employs optical fiber such as multimode optical fiber having modes for propagating optical signals and single mode optical fiber having one mode for propagating optical signals. One end of the terminal optical cable 22a is coupled to the front camera 21a, the other end is coupled to the first switching hub 11A. Conversion units such as the optical-electrical conversion unit to convert optical signals into electrical signals and the electric-optical conversion unit for converting electrical signals into optical signals are installed between the terminal optical cable 22a and the first switching hub 11A. The terminal optical cable 22a propagates an optical signal output from the front camera 21a and outputs the optical signal to the first switching hub 11A.

The terminal electrical wire 22b is a wire that conducts electrical signals, and as described above, may include a wire with an insulation coating applied to a core wire that includes the conductive metal wires bundled and twisted together, a metal rod with an insulation coating applied to a conductive rod member, a bus bar, a planar circuit body (for example, FPC or FFC, etc.). One end of the terminal electrical wire 22b is coupled to the ECU 21b, and the other end is coupled to the first switching hub 11A. The terminal electrical wire 22b outputs an electrical signal output from the ECU 21b to the first switching hub 11A. The terminal electrical wire 22b outputs an electrical signal output from the first switching hub 11A to the ECU 21b.

The terminal electrical wire 22c is a wire that conducts electrical signals and utilizes a structure identical to the above described terminal electrical wire 22b. One end of the terminal electrical wire 22c is coupled to the ECU 21c, and the other end is coupled to the first switching hub 11A. The terminal electrical wire 22c outputs an electrical signal output from the ECU 21c to the first switching hub 11A, and outputs an electrical signal output from the first switching hub 11A to the ECU 21c.

The first terminal communication line bundle 22A in this way includes the terminal optical cable 22a for propagating optical signals and the terminal electrical wires 22b, 22c for conducting electrical signals. The first terminal communication line bundle 22A has a larger number of the terminal electrical wires 22b, 22c that conduct electrical signals, than the terminal optical cable 22a wires for propagating optical signals. The structure of the first terminal communication line bundle 22A in this way includes a large number of wires that strongly resist bending and therefore has superior wire routing characteristics.

The second terminal module 20B utilizes a structure identical to the first terminal module 20A. Specifically, the second terminal module 20B includes the electronic components 21 (second terminal device) of the vehicle V. The second terminal module 20B is installed at the rear R side of the vehicle V along the overall length direction X of the vehicle V. The second terminal module 20B for example, includes the electronic components 21 and a second terminal communication line bundle 22B. The electronic components 21 include for example, the rear camera 21d, the ECUs 21e, 21f. The rear camera 21d is for example, for capturing rearward vehicle images of the vehicle V. The ECUs 21e, 21f are for example for controlling tail lamps and various motors of vehicle V.

The second terminal communication line bundle 22B couples the electronic components 21 and the second switching hub 11B for communication. The second terminal communication line bundle 22B includes a terminal optical cable 22d and a terminal electrical wires 22e, 22f. The terminal optical cable 22d is an optical fiber to propagate optical signals and as described above, is configured from quartz glass optical fiber and plastic optical fiber, etc. The terminal optical cable 22d employs optical fibers such as multimode optical fiber having modes for propagating optical signals and signal mode optical fiber having one mode for propagating optical signals. One end of the terminal optical cable 22d is coupled to the rear camera 21d, and the other end is coupled to the second switching hub 11B. Conversion units such as the optical-electrical conversion unit to convert optical signals into electrical signals and the electric-optical conversion unit for converting electrical signals into optical signals are installed between the terminal optical cable 22d and the second switching hub 11B. The terminal optical cable 22d propagates the optical signal output from the rear camera 21d and outputs the propagated optical signals to the second switching hub 11B.

The terminal electrical wire 22e is a wire that conducts electrical signals, and as described above may include a wire with an insulation coating applied to a core wire that includes the conductive metal wires bundled and twisted together, a metal rod with an insulation coating applied to a conductive rod member, a bus bar, a planar circuit body (for example, FPC or FFC, etc.), etc. One end of the terminal electrical wire 22e is coupled to the ECU 21e, and the other end is coupled to the second switching hub 11B. The terminal electrical wire 22e outputs an electrical signal output from the ECU 21e to the second switching hub 11B.

The terminal electrical wire 22e outputs the electrical signal output from the second switching hub 11B to the ECU 21e.

The terminal electrical wire 22f is a wire that conducts electrical signals and utilizes the structure identical to the above described terminal electrical wire 22e. One end of the terminal electrical wire 22f is coupled to the ECU 21f and the other end is coupled to the second switching hub 11B. The terminal electrical wire 22f outputs an electrical signal output from the ECU 21f to the second switching hub 11B, and outputs an electrical signal output from the second switching hub 11B to the ECU 21f.

The second terminal communication line bundle 22B in this way, includes the terminal optical cable 22d for propagating optical signals and the terminal electrical wires 22e, 22f for conducting electrical signals. The second terminal communication line bundle 22B has a larger number (2 wires) of the terminal electrical wires 22e, 22f for conducting electrical signals than the number (1 wire) of the terminal optical cable 22d wire for propagating optical signals. The second terminal communication line bundle 22B in this way can maintain communication speed while improving the wire routing characteristics by including numerous bend-resistant wires.

As described above, the vehicle communication system 1 of the first embodiment includes the core module 10, the first terminal module 20A, and the second terminal module 20B. The core module 10 that is installed on the vehicle V includes the first switching hub 11A, the second switching hub 11B, and the core communication line bundle 12. The first and the second switching hubs 11A, 11B relay the data. The core communication line bundle 12 includes the core optical cable 12a for propagating optical signals and the core electrical wire 12b for conducting electrical signals. In the core communication line bundle 12, the first switching hub 11A is coupled to the second switching hub 11B for communication by the core optical cable 12a and the core electrical wire 12b. The first terminal module 20A includes the electrical components 21, and the first terminal communication line bundle 22A that couples the electronic components 21 and the first switching hub 11A for communication. The second terminal module 20B includes the electronic components 21, and the second terminal communication line bundle 22B that couples the electronic components 21 and the second switching hub 11B for communication. In the core communication line bundle 12, the core optical cable 12a has a larger communication traffic volume than that of the core electrical wire 12b.

In this structure of the vehicle communication system 1, the core communication line bundle 12 has a larger optical communication traffic volume than electrical communication traffic volume so that the communication noise between the first terminal module 20A and the second terminal module 20B can be reduced. The vehicle communication system 1 also prevents attenuation of the signal from occurring due to a long distance between the first terminal module 20A and the second terminal module 20B. The vehicle communication system 1 in this way improves the communication quality and consequently configures a suitable system.

In the vehicle communication system 1, the first terminal communication line bundle 22A includes at least one of either the terminal optical cable 22a for propagating optical signals, or the terminal electrical wires 22b, 22c for conducting electrical signals. The number of the terminal electrical wires 22b, 22c is also larger than the number of the terminal optical cables 22a. The second terminal communication line bundle 22B includes at least one of either the terminal optical cable 22d for propagating optical signals, or the terminal electrical wires 22e, 22f for conducting electrical current. The number of terminal electrical wires 22e, 22f is larger than the number of the terminal optical cable 22d.

The vehicle communication system 1 can by way of this structure improve the wire routing characteristics by routing the terminal electrical wires 22b, 22c that have better bend-resistance than the terminal optical cable 22a and so are easier to route when for example routing the first terminal communication line bundle 22A within a jumbled location at the front F or rear R of the vehicle V. The vehicle communication system 1 can on the other hand, maintain the communication speed by utilizing the terminal optical cable 22a that has a faster communication speed than the terminal electrical wires 22b, 22c. The vehicle communication system 1 also has a structure including many terminal electrical wires 22b, 22c in the separate specification section Q so that optimized material can be obtained from a diverse selection made according to user needs.

In the vehicle communication system 1, the first terminal module 20A is installed on the front F side of the vehicle V along the overall length direction X of the vehicle V, and the second terminal module 20B is installed on the rear R side of the vehicle V along the overall length direction X of the vehicle V. The core communication line bundle 12 is installed in the intermediate section M between the front F of vehicle V and the rear R of the vehicle V. By utilizing this structure in the vehicle communication system 1, the core section (what is called backbone) of the communication system of the vehicle V can be configured from the core communication line bundle 12 and the communication quality of the vehicle V can be improved between the front F and the rear R of the vehicle V. Even if the communication traffic volume of the vehicle communication system 1 is increased or decreased by upgrading or downgrading the first and the second terminal modules 20A, 20B, optical communication can be set as the main communication to effectively deal with those changes and versatility is improved.

In the vehicle communication system 1, the core module 10 includes the standard specification section P applicable commonly to a plurality of vehicles V. The first terminal module 20A and the second terminal module 20B on the other hand, configure the separate specification section Q for making individual changes according to the vehicle V. In the structure of the vehicle communication system 1, the standard specification section P is designed for standardized usage to the greatest extent possible and to provide common usage and versatility regardless of the applicable vehicle model, platform, or vehicle grade, etc. In the vehicle communication system 1, the separate specification section Q can meet various customer needs by providing variations according to the vehicle model, platform, and vehicle grade, etc.

Second Embodiment

Figure 2:
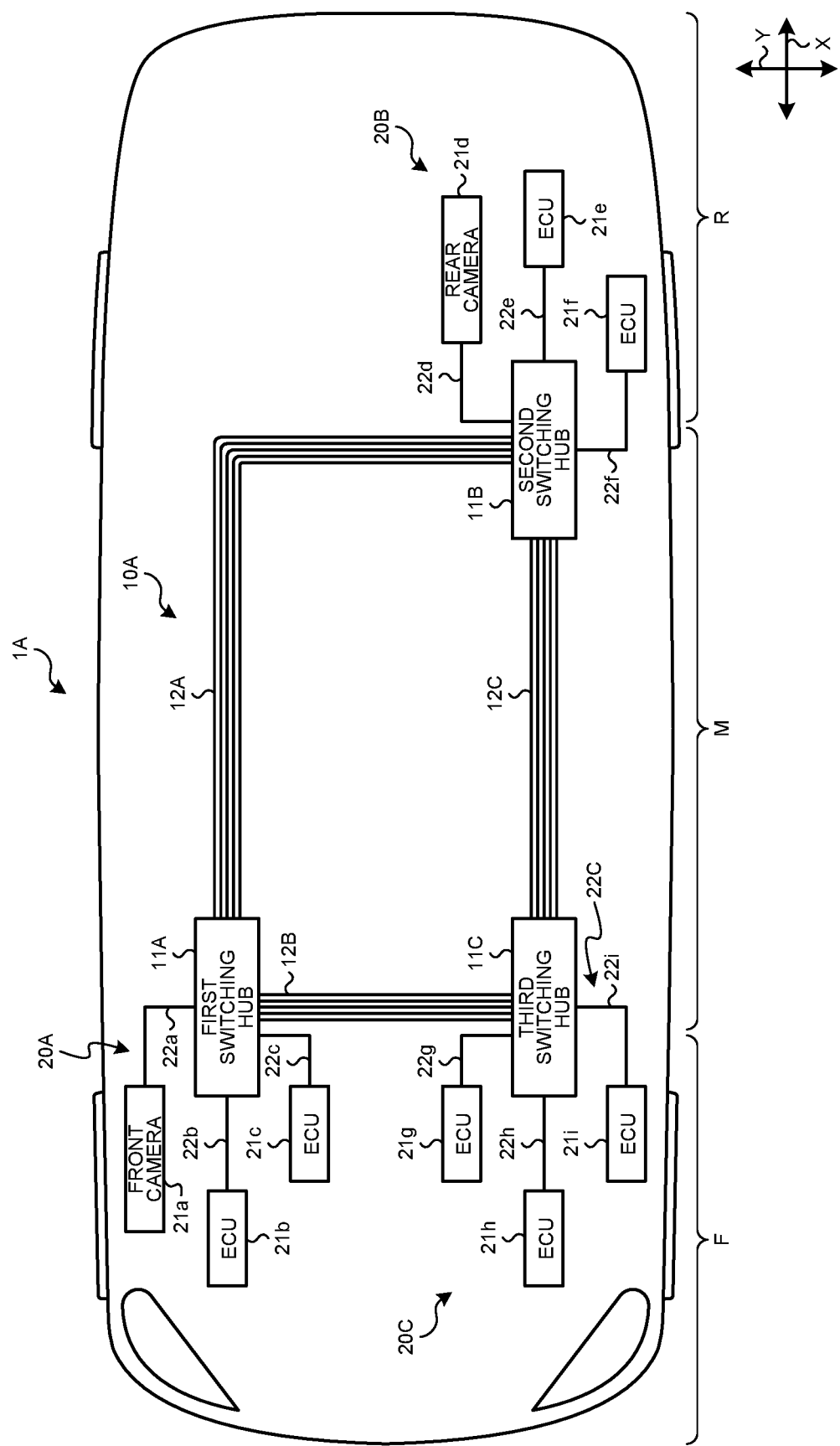
FIG. 2 is a block diagram illustrating an example of the structure of the vehicle communication system of the second embodiment.

A vehicle communication system 1A of the second embodiment is described next. FIG. 2 is a block diagram illustrating an example of the structure of the vehicle communication system 1A of the second embodiment. Unlike vehicle communication system 1 of the first embodiment, the vehicle communication system 1A of the second embodiment differs in that the communication network of a core module 10A is ring shape. In the second embodiment, structural elements identical to the first embodiment are assigned the same reference numerals and a detailed description of those elements is omitted.

In the vehicle communication system 1A of the second embodiment, as illustrated in FIG. 2, the communication network is formed in a ring shape, and includes a core module 10A and the first to third terminal modules 20A to 20C. The core module 10A includes the first to third switching hubs 11A to 11C, and a core communication line bundle 12A to 12C.

The first switching hub 11A is installed on the front F side along the overall length direction X of the vehicle V, the second switching hub 11B is installed on the rear R side along the overall length direction X of the vehicle V, and the third switching hub 11C is installed along the front F side along the overall length direction X of the vehicle V. The core communication line bundles 12A to 12C are installed at the intermediate section M between the front F of vehicle V and the rear R of the vehicle V. The first switching hub 11A is coupled to the second switching hub 11B by way of the core communication line bundle 12A, and also coupled to the third switching hub 11C by way of the core communication line bundle 12B. The second switching hub 11B is coupled to the first switching hub 11A by way of the core communication line bundle 12A, and also coupled to the third switching hub 11C by way of the core communication line bundle 12C. The third switching hub 11C is coupled to the first switching hub 11A by way of the core communication line bundle 12B, and also coupled to the second switching hub 11B by way of the core communication line bundle 12C.

The first to third switching hubs 11A, 11B, and 11C in the vehicle communication system 1A are in this way mutually coupled, forming a ring-shaped communication network. The vehicle communication system 1A having this configuration can therefore communicate along another communication path even if an abnormality occurs on a portion of the communication paths of the communication network. The vehicle communication system 1A can therefore for example transfer data from the first switching hub 11A to the second switching hub 11B by way of the core communication line bundle 12B and the core communication line bundle 12C even if an abnormality occurs on the core communication line bundle 12A. The vehicle communication system 1A can in this way improve the robustness against faults or damage. The third switching hub 11C is coupled by way of a third terminal communication line bundle 22C (terminal electrical wires 22g, 22h, and 22i) to an ECU 21g, 21h, and 21i.

Third Embodiment

Figure 3:
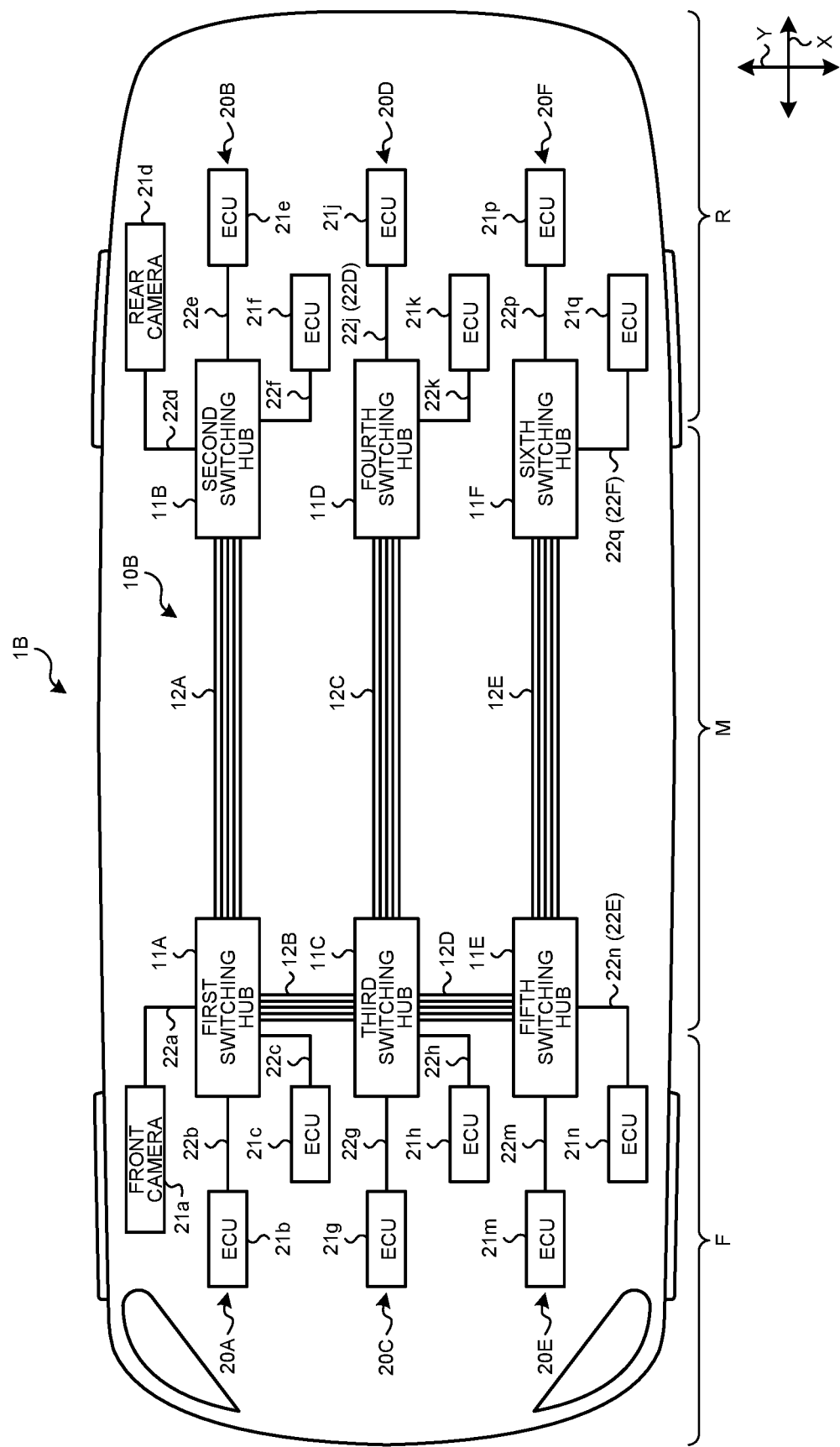
FIG. 3 is a block diagram illustrating an example of the structure of the vehicle communication system of the third embodiment.

A vehicle communication system 1B of the third embodiment is described next. FIG. 3 is a block diagram illustrating an example of the structure of the vehicle communication system 1B of the third embodiment. The vehicle communication system 1B of the third embodiment differs from the vehicle communication systems 1 and 1A of the first and the second embodiments in the point that communication network of a core module 10B is formed in an E shape. In the third embodiment, structural elements identical to the vehicle communication systems 1 and 1A of the first and the second embodiments are assigned the same reference numerals and a detailed description of those elements is omitted.

As illustrated in FIG. 3, the communication network of the vehicle communication system 1B of the third embodiment is formed in an E shape, and includes a core module 10B, and first to sixth terminal modules 20A to 20F. The core module 10B includes the first to sixth switching hubs 11A to 11F, and the core communication line bundles 12A to 12E. The first, third, and fifth switching hubs 11A, 11C, and 11E are installed on the front F side along the overall length direction X of the vehicle V, and the second, fourth, and sixth switching hubs 11B, 11D, and 11F are installed on the rear R side along the overall length direction X of the vehicle V. The first, third, and fifth switching hubs 11A, 11C, and 11E are disposed in sequence along the vehicle width direction Y, and the second, fourth, and sixth switching hubs 11B, 11D, and 11F are also are disposed in sequence along the vehicle width direction Y. The core communication line bundles 12A to 12E are installed in the middle section M between the front F of vehicle V and the rear R of the vehicle V.

The first switching hub 11A is coupled by way of the core communication line bundle 12A to the second switching hub 11B, the third switching hub 11C is coupled by way of the core communication line bundle 12C to the fourth switching hub 11D, and the fifth switching hub 11E is coupled by way of the core communication line bundle 12E to the sixth switching hub 11F. Further, the first switching hub 11A is coupled by way of the core communication line bundle 12B to the third switching hub 11C, and the third switching hub 11C is coupled by way of the core communication line bundle 12D to the fifth switching hub 11E.

The vehicle communication system 1B includes a plurality of core communication line bundles 12A, 12C, and 12E extending along the overall length direction X of the vehicle V, and the core communication line bundles 12B and 12D extending along the vehicle width direction Y of the vehicle V. Utilizing this structure allows forming a communication path coupling the first to sixth switching hubs 11A to 11F. The vehicle communication system 1B can communicate data dispersed on the core communication line bundles 12A, 12C, and 12E when there is increased communication traffic volume between the front F and the rear R of the vehicle V so that data delays can be prevented in such cases.

Modification

A modification of the embodiments is described next. The first terminal communication line bundle 22A is described in the example as having a larger number of the terminal electrical wires 22b, 22c than the terminal optical cables 22a, however the invention is not limited to this example, and for example the number of terminal optical cables may be larger than the number of terminal electrical wires. The example for the second terminal communication line bundle 22B is described as having a larger number of the terminal electrical wires 22e, 22f than terminal optical cables 22d, however the invention is not limited to this example, and for example, the number of terminal optical cables may be larger than the number of terminal electrical wires.

The first terminal module 20A is described as installed on the front F side of the vehicle V along the overall length direction X of the vehicle V, the second terminal module 20B is described as installed on the rear R side of the vehicle V along the overall length direction X of the vehicle V, and the core communication line bundle 12 is described as installed in the intermediate section M between the front F of vehicle V and the rear R of the vehicle V, however the invention is not limited to this example. For example, the first terminal module 20A may be installed on one side in the vehicle width direction Y of vehicle V, the second terminal module 20B may be installed on the other side in the vehicle width direction Y of vehicle V, and the core communication line bundle 12 may be installed at the intermediate section between one side of the vehicle width direction Y of vehicle V and the other side of the vehicle width direction Y of vehicle V.

In the vehicle communication system 1, the core module 10 is described as including a standard specification section P applicable commonly to a plurality of vehicles V, and the first terminal module 20A and the second terminal module 20B include a separate specification section Q allowing individual changes according to the vehicle V, however the invention is not limited to this example and needs not include a standard specification section P or a separate specification section Q.

In the vehicle communication system 1, the percentage of the optical communication traffic volume of the core module 10 may be larger than the optical communication traffic volume of the first terminal module 20A and the second terminal module 20B.

The vehicular LAN example is described as employing the Ethernet communication standard, however the invention is not limited to this example, and for example, other communication standards such as CAN, CAN-FD may be employed.

The relay device in the example is described as a switching hub that transfers information to a unique port based on the routing table, however the invention is not limited to this example, and a hub that transfers information to all the ports may be utilized.

An example of the standard specification section P is described utilizing the core module 10 including the first switching hub 11A, the second switching hub 11B, and the core communication line bundle 12, however the present invention is not limited to this example. The standard specification section P may for example be the core module 10 including the core communication line bundle 12 and without including the first and the second switching hubs 11A, 11B. In this case, the first terminal module 20A includes the first switching hub 11A, and further includes the electronic components 21 and the first terminal communication line bundle 22A as the separate specification section Q. The first switching hub 11A may in this way individually handle parts that can be changed.

Specifically, the first terminal module 20A includes the electronic components 21, the first switching hub 11A to relay data among the electronic components 21, and the first terminal communication line bundle 22A to couple the electronic components 21 and the first switching hub 11A. The second terminal module 20B includes the electronic components 21, the second switching hub 11B to relay data among the electronic components 21, and the second terminal communication line bundle 22B to couple the electronic components 21 and the second switching hub 11B. The core communication line bundle 12 includes the core optical cable 12a to propagate optical signals and a core electrical wire 12b for conducting electrical signals, and couples the first switching hub 11A and the second switching hub 11B by way of the core optical cable 12a and the core electrical wire 12b for communication. In the core communication line bundle 12, the core optical cable 12a has a larger communication traffic volume than the communication traffic volume of the core electrical wire 12b. In this way, the first terminal module 20A includes the first switching hub 11A and the second terminal module 20B includes the second switching hub 11B, so that the first and the second switching hubs 11A, 11B are handled separately as parts that can be changed.

In a vehicle communication system according to the present embodiment, in the core communication line bundle, the core optical communication line has a larger communication traffic volume than that of the core electrical wire, so the communication quality can be improved and consequently a suitable system can be constructed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle communication system comprising:
   a core module that is installed in a vehicle and includes a first relay device to relay data, a second relay device to relay data, and a core communication line bundle including a core optical communication line to propagate optical signals and a core electrical wire to conduct electrical signals, the core communication line bundle coupling the first relay device and the second relay device for communication by way of the core optical communication line and the core electrical wire;
   a first terminal module that includes a plurality of first terminal devices, and a first terminal communication line bundle that couples the first terminal devices and the first relay device for communication;
   a second terminal module that includes a plurality of second terminal devices, and a second terminal communication line bundle that couples the second terminal devices and the second relay device for communication, wherein
   in the core communication line bundle, the core optical communication line has a larger communication traffic volume than that of the core electrical wire,
   the first terminal communication line bundle and the second terminal communication line bundle include at least one of a terminal optical communication line that propagates optical signals and a terminal electrical wire that conducts electrical signals, and
   number of terminal electrical wires is larger than number of terminal optical communication lines.

2. The vehicle communication system according to claim 1, wherein
   the first terminal module is installed at a front section side of the vehicle along an overall length direction of the vehicle,
   the second terminal module is installed at a rear section side of the vehicle along the overall length direction of the vehicle, and
   the core communication line bundle is installed at an intermediate section between the front section of the vehicle and the rear section of the vehicle.

3. The vehicle communication system according to claim 1, wherein
   the core module includes a standard specification section applicable commonly to a plurality of vehicles, and
   the first terminal module and the second terminal module include a separate specification section for individual changes according to the vehicle.

4. The vehicle communication system according to claim 2, wherein
   the core module includes a standard specification section applicable commonly to a plurality of vehicles, and
   the first terminal module and the second terminal module include a separate specification section for individual changes according to the vehicle.

5. A vehicle communication system comprising:
   a first terminal module that is installed in a vehicle and includes a plurality of first terminal devices, a first relay device to relay data among the first terminal devices, and a first terminal communication line bundle that couples the first terminal devices and the first relay device;
   a second terminal module that includes a plurality of second terminal devices, a second relay device to relay data among the second terminal devices, and a second terminal communication line bundle that couples the second terminal devices and the second relay device; and
   a core communication line bundle that includes a core optical communication line to propagate optical signals and a core electrical wire to conduct electrical signals, and that couples the first relay device and the second relay device for communication by way of the core optical communication line and the core electrical wire, wherein
   in the core communication line bundle, the core optical communication line has a larger communication traffic volume than that of the core electrical wire,
   the first terminal communication line bundle and the second terminal communication line bundle include at least one of a terminal optical communication line that propagates optical signals and a terminal electrical wire that conducts electrical signals, and
   number of terminal electrical wires is larger than number of terminal optical communication lines.

* * * * *